United States Patent
Randecker et al.

(10) Patent No.: US 7,753,627 B2
(45) Date of Patent: Jul. 13, 2010

(54) SINGLE-LIP DRILL AND METHOD FOR THE PRODUCTION THEREOF

(75) Inventors: Hermann Randecker, Dettingen (DE); Heiner Baumgärtner, Bad Urach (DE)

(73) Assignee: TBT Tiefbohrtechnik GmbH & Co. (DE)

( * ) Notice: Subject to any disclaimer, the term of this patent is extended or adjusted under 35 U.S.C. 154(b) by 231 days.

(21) Appl. No.: 10/552,111

(22) PCT Filed: Apr. 3, 2004

(86) PCT No.: PCT/EP2004/003575
§ 371 (c)(1),
(2), (4) Date: Sep. 19, 2006

(87) PCT Pub. No.: WO2004/087356
PCT Pub. Date: Oct. 14, 2004

(65) Prior Publication Data
US 2007/0041801 A1  Feb. 22, 2007

(30) Foreign Application Priority Data
Apr. 4, 2003 (DE) ................. 103 16 116

(51) Int. Cl.
*B23B 51/00* (2006.01)
(52) U.S. Cl. ............. 408/199; 408/144; 408/227; 407/116
(58) Field of Classification Search .......... 408/57, 408/59, 199, 227, 229, 230, 144; 407/116
See application file for complete search history.

(56) References Cited
U.S. PATENT DOCUMENTS 2,334,089 A * 11/1943 Hallden ............ 408/211
2,552,463 A * 5/1951 Searles ............ 408/56
2,966,081 A * 12/1960 Kallio ............ 408/230

(Continued)

FOREIGN PATENT DOCUMENTS

DE   397 002 C    6/1924

(Continued)

OTHER PUBLICATIONS

Tool and Manufacturing Engineers Handbook, Fourth Edition, vol. I, Machining, Society of Manufacturing Engineers, 1983, chapter 9, pp. 14-15.*

(Continued)

*Primary Examiner*—Daniel W Howell
(74) *Attorney, Agent, or Firm*—Akerman Senterfitt

(57) ABSTRACT

Disclosed is a single-lip drill comprising a drill head (11) that is provided with a blade (12) which is embodied on said drill head. The blade encompasses a cutting edge (19) for machining a workpiece (16) in a cutting manner. At least one chip-forming device (21) which shapes chips (22) cut by the cutting edge is associated with the cutting edge. The chip-forming device is provided with a positive cutting angle (gamma) such that the mechanical and thermal stress can be reduced in the area of the blade (12). In addition, the chip-forming device can comprise a functional coating (29a, 29b) which is made especially of hard material and is applied after providing the drill with the exterior shape thereof.

17 Claims, 4 Drawing Sheets

U.S. PATENT DOCUMENTS

| | | | |
|---|---|---|---|
| 3,199,381 A | | 8/1965 | Mackey |
| 3,274,863 A | * | 9/1966 | Faber .................. 408/207 |
| 3,422,706 A | | 1/1969 | Lunsford |
| 3,504,413 A | * | 4/1970 | Matsche, Jr. et al. ........ 407/113 |
| 4,060,335 A | * | 11/1977 | Holloway et al. ........... 408/233 |
| 4,100,983 A | | 7/1978 | Herrmann et al. |
| 5,443,585 A | | 8/1995 | Kawase et al. |
| 6,012,881 A | * | 1/2000 | Scheer .................. 408/227 |
| 6,135,681 A | * | 10/2000 | Nuzzi et al. ................. 408/227 |
| 6,371,702 B1 | * | 4/2002 | DeWald et al. ............. 408/227 |
| 6,565,296 B2 | * | 5/2003 | McKinley et al. ........... 408/224 |
| 6,685,402 B2 | * | 2/2004 | Mast et al. ................. 408/227 |
| 7,018,145 B2 | * | 3/2006 | Mast et al. ................. 408/233 |
| 7,147,413 B2 | * | 12/2006 | Henderer et al. ........... 408/144 |
| 2002/0132141 A1 | | 9/2002 | Toihara |
| 2002/0172569 A1 | | 11/2002 | Nakamura |

FOREIGN PATENT DOCUMENTS

| | | | |
|---|---|---|---|
| DE | 79 05 118 | | 5/1979 |
| DE | 2938715 A1 | * | 5/1980 |
| DE | 83 32 287 | | 3/1984 |
| DE | 33 14 718 A1 | | 10/1984 |
| DE | 36 29 034 A1 | | 3/1988 |
| JP | 59 069207 A | | 4/1984 |
| JP | 63 047004 A | | 2/1988 |
| JP | 63102814 A | * | 5/1988 |
| JP | 08229720 A | * | 9/1996 |
| JP | 10109210 A | * | 4/1998 |
| JP | 11129109 A | * | 5/1999 |
| JP | 2000107920 A | * | 4/2000 |

OTHER PUBLICATIONS

EPO website translation of DE 3314718, printed Nov. 17, 2008, four pages.*

* cited by examiner

"X"

SINGLE-LIP DRILL AND METHOD FOR THE PRODUCTION THEREOF

FIELD OF USE AND PRIOR ART

The invention relates to a single-lip drill and to a method for its manufacture. The single-lip drill has a drill head provided with a blade or bit. The bit has a cutting edge for the machining by cutting of a work-piece. With the cutting edge is associated at least one chip former for shaping the chips cut off by the cutting edge.

Single-lip drills are standard drills used in deep drilling. Deep drilling is a cutting method for producing or making holes. Deep holes are normally those having a diameter between approximately 1 and 1500 mm and having a depth starting from approximately three times the diameter. Single-lip drilling is a special variant of deep drilling, where use is made of a single-lip drill. Single-lip drills can be subdivided into those with a bit ground on the tool and those having a replaceable bit, e.g. in the form of a cutting tip or reversible cutting tip. Single-lip deep drilling is preferably performed with diameters from approximately 0.8 to 40 mm. The cooling lubricant or coolant supply takes place through one or more holes in the interior of the drill. The coolant is a substance which is used during separation and working of workpieces for cooling and lubricating purposes. The draining off of the coolant-chip mixture in the case of the single-lip drill takes place through a longitudinal groove or corrugation on the outer tool shank. The use of large coolant quantities is ecologically objectionable, because the coolant-chip mixture constitutes waste material, which must be disposed of or reprocessed. Thus, increasingly use is made of minimum quantity lubrication, in which the lubricant quantity used is reduced to the absolute minimum. However, despite the limited coolant quantity, a problem is to ensure an adequate chip removal in order to ensure a good deep drilling process quality.

PROBLEM AND SOLUTION

The problem of the invention is to provide a single-lip drill of the aforementioned type, which operates in a production-reliable manner even in the case of minimum quantity lubrication and which in particular has a high wear resistance.

This problem is solved by a single-lip drill having the features of claim 1 and by a method for its manufacture having the features of claim 15. Further developments of the invention appear in the subclaims. By reference the wording of all the claims is made into part of the content of the description.

The single-lip drill according to the invention is characterized in that it has a chip former with a positive rake angle.

In the sense of the present application a single-lip drill is of the type with a drill head with a bit formed thereon. In particular, the bit is integrally connected to the drill head and is e.g. ground into the latter.

The bit or cutting wedge in the sense of the application is understood to mean the single-lip drill area participating in chip production. The cutting wedge is bounded by the tool face which can come directly into contact with the cut off chips and the clearance. The chip surface is the surface on the cutting wedge against which feeds the chips. The surface on the cutting wedge facing the resulting workpiece surface or machining surface is called the clearance. The line where the tool face and the clearance contact one another is known as the cutting edge. The rake angle designates the angle between an imaginary linen perpendicular to the machining surface of the workpiece to be machined and the tool face at the cutting edge. There can be several cutting edges, e.g. an outer bit and an inner bit. The wedge angle is the angle between the tool face and the clearance and the clearance angle is the angle between the machining surface and the clearance. Chip formers or breakers are used for forming or breaking chips and are provided in those cases where chip breaking is not ensured. This can e.g. arise if the deformability of the workpiece is very high and a "continuous chip" is formed, which only breaks very late without a breaking aid. With each cutting edge can be associated at least one chip former, e.g. the outer bit can have a chip former and the inner bit another chip former.

The positive rake angle on the chip former of the inventive single-lip drill ensures that unlike in the case of e.g. conventional single-lip drills with a 0° rake angle, the cut off chip no longer feeds against the tool face at right angles, but instead in sloping manner, because the tool face is inclined with respect to the imaginary line perpendicular to the machining surface. Thus, on meeting the tool face the chips are less strongly compressed, so that the loading of the tool face produced by the impinging chips and which can e.g. lead to heat evolution due to the friction between chips and workpiece, is relatively limited. Thus, a so-called "soft" cut is produced. Thus, the single-lip drill according to the invention can be used in production-reliable manner with minimum quantity lubrication, e.g. with compressed air or when using coolants having a low viscosity.

A further advantage of the single-lip drill according to the invention is that a planned chip shaping of the cut off chips is possible and can be adapted to minimum quantity lubrication conditions. For reliable chip removal by the coolant, it is firstly necessary for the chips not to exceed a given size, because otherwise they would not be reliably carried along through the limited space within the corrugation. This can lead to the chips collecting in the vicinity of the bit, so as to impede the drilling process. In the case of conventional single-lip drills with a rake angle of 0ø, the problem of a long-breaking chip does not normally arise, because as a result of the strong chip compression on the tool face usually a short-breaking chip is formed. However, extremely short chips are also not reliably removed when using coolants with a low viscosity, because they do not offer an adequate resistance. As a result of a chip breaker with a positive rake angle chips are formed which are small enough to be reliably moved and on the other large enough to offer low viscosity coolants an adequate removal application surface.

The rake angle of the chip former is preferably 10° to 30°, particularly 15° to 25°.

The chip former can have areas with different positive tangent angles, so that the chip sliding along the chip former is compressed or deformed to a different extent in different areas. The tangent or tool face angle is the angle between an imaginary line perpendicular to the machining surface of the workpiece to be machined and a tangent on the tool face, excluding the area directly at the cutting edge. The angle directly at the cutting edge is called the rake angle. Preferably the rake angle at the cutting edge is positive, so that the chips are not very compressed there, so that the surface loading caused by the impinging chips on the cutting edge is relatively small. Preferably on passing through the chip former the chips subsequently arrive in areas where the tangent angle is smaller compared with the "cutting edge" area, so that it is more strongly compressed there. The chips can pass through areas with an approximately 0° tangent angle or even a negative tangent angle with strong chip compression. At some time chip compression or loading is so great that the chip breaks.

According to a further development of the invention, the chip former has a chip guide face for guiding the chips and a chip break section for breaking the chips. Preferably the chip guide face is the area substantially directly adjacent to the cutting edge and against which the chips are fed just after removal. Preferably the chip guide face has a relatively large, positive rake angle and areas with a unitary tangent angle virtually identical to the rake angle or areas with different positive tangent angles. The chip break section is preferably connected directly to the chip guide face. There, compared with the chip guide face, there can be smaller positive tangent angles, a 0° tangent angle or even a negative tangent angle, which can bring about chip breaking.

In particularly preferred manner the chip break section is located at a distance from the cutting edge suitable for setting a desired chip size. This allows a planned chip size setting of the cut off chip. By varying the distance between the chip break section and the cutting edge it is possible to produce chips with a different size and shape, which are adapted in optimum manner to the given coolant conditions, particularly to minimum quantity lubrication conditions, i.e. can be reliably removed.

As to when the chip breaks in the chip break section is dependent on different influencing factors, which should be taken into account when fixing the spacing. Such influencing factors are e.g. the workpiece material characteristics of the workpiece to be machined, particularly its deformability, the working speed of the drilling process, etc.

The spacing can e.g. be 0.2 to 1.5 mm, particularly 0.3 to 0.6 mm.

Preferably the chip former or breaker is constructed in the form of a slot or channel adjacent to the cutting edge. The slot-like chip former can be subdivided into two areas. A first, particularly arcuately curved area, can extend from the cutting edge to a slot bottom. This area can be referred to as the chip guide face. Preferably the positive tangent angle which can be determined by applying a tangent to the curvature, more particularly continuously decreases therein towards the slot bottom until finally on the latter an approximately 0° tangent angle is reached. A second, particularly arcuately curved area can extend from the slot bottom to a boundary surface with respect to the corrugation provided for removing the coolant-chip mixture. This area can be referred to as the chip break section and, starting from a substantially 0° tangent angle at the slot bottom, it can become ever more negative towards the boundary surface.

It is alternatively possible for the chip guide surface of the chip former not to be curved and instead to be in the form of a sloping surface with a uniform, positive tool face or tangent angle. This sloping chip guide surface can be followed by a curved or radius-provided chip break section.

According to a further development of the invention a functional coating is provided on at least one functional surface of the single-lip drill. Functional surfaces in the sense of the application are in particular those surfaces which fulfil a specific function during the deep drilling process, e.g. the cutting off of chips, the supporting of the drill in the hole, the removal of chips, etc. In particularly preferred manner the functional surface is the chip former used for chip shaping purposes. At least the chip former, particularly its chip guide face and chip break section can be provided with the functional coating.

It is possible to provide the functional coating on several or all the functional surfaces participating in the cutting process. The functional coating can be provided on all the functional surfaces directly in contact with the workpiece. This can e.g. relate to the work guides and cylindrical margin used for supporting the single-lip drill in the hole. These functional surfaces also include the area of the cutting edge which is in contact directly both with the workpiece and with the cut off chips. Additionally the clearance and boundary surfaces of the chip-removing corrugation can be provided with the functional coating.

One function of the functional coating is to increase the wear resistance of the drill, particularly at high cutting speeds. As a result of the functional coating abrasion of the single-lip drill on contact with the workpiece to be worked, particularly in the vicinity of the cutting edge, is reduced. In addition, there is a prevention of cratering, which can arise when chips slide on the chip former and chip out material from the structure of the latter. Another advantage of the functional coating is that adhesion between the single-lip drill and the workpiece to be worked is reduced. It in particular prevents, especially at high pressure levels between the single-lip drill and the workpiece, a welding together of the workpiece material and the bit known as a "built-up cutting edge".

The functional coating can at least partly comprise a hard material, particularly a metallic hard material. Preferably a nitride or carbide is used as the metallic hard material. However, it is also possible to use a boride or silicide. In particularly preferred manner use is made of a light metal nitride, particularly titanium aluminium nitride.

It is alternatively possible to use nonmetallic hard materials, e.g. diamond, boron carbide or boron nitride.

The functional coating can have several, particularly superimposed layers. It can have at least one hard material layer and at least one soft material layer adjacent to the hard material layer, the latter forming an outer layer or surface.

The invention also relates to a method for the manufacture of a single-lip drill having the features of the independent claim 15.

The inventive method is characterized in that firstly a drill head with a typical single-lip drill geometry is manufactured. This in particular involves the manufacture of the drill head from a raw material, e.g. by a sintering process, the formation of a coolant channel for the supply of coolant, the formation of a corrugation for removing the coolant-chip mixture, the formation, particularly by grinding in of the bit, etc.

Another step in the inventive method is the formation of a chip former or breaker in the vicinity of the single-lip drill bit. Finally, at least one functional surface of the single-lip drill is provided with a functional coating. Firstly the shaping of the drill head is completed and then a functional coating is applied, so that at least the chip former is also provided with the functional coating. This significantly differentiates the inventive method from conventional methods, where in the final step the chip former is ground in, so that any coating on the latter has to be ground away again and then the chip former no longer has a coating.

For further details of the method reference is made to the above description and the subsequent description relative to the drawings.

These and further features can be gathered from the claims, description and drawings and the individual features, both singly and in the form of subcombinations, can be implemented in an embodiment of the invention and in other fields and can represent advantageous, independently protectable constructions. The subdivision of the application into individual sections and the subheadings in no way restricts the general validity of the statements made thereunder.

BRIEF DESCRIPTION OF THE DRAWINGS

Embodiments of the invention are illustrated in the attached drawings, wherein show.

DETAILED DESCRIPTION OF THE EMBODIMENTS

Figure 1:
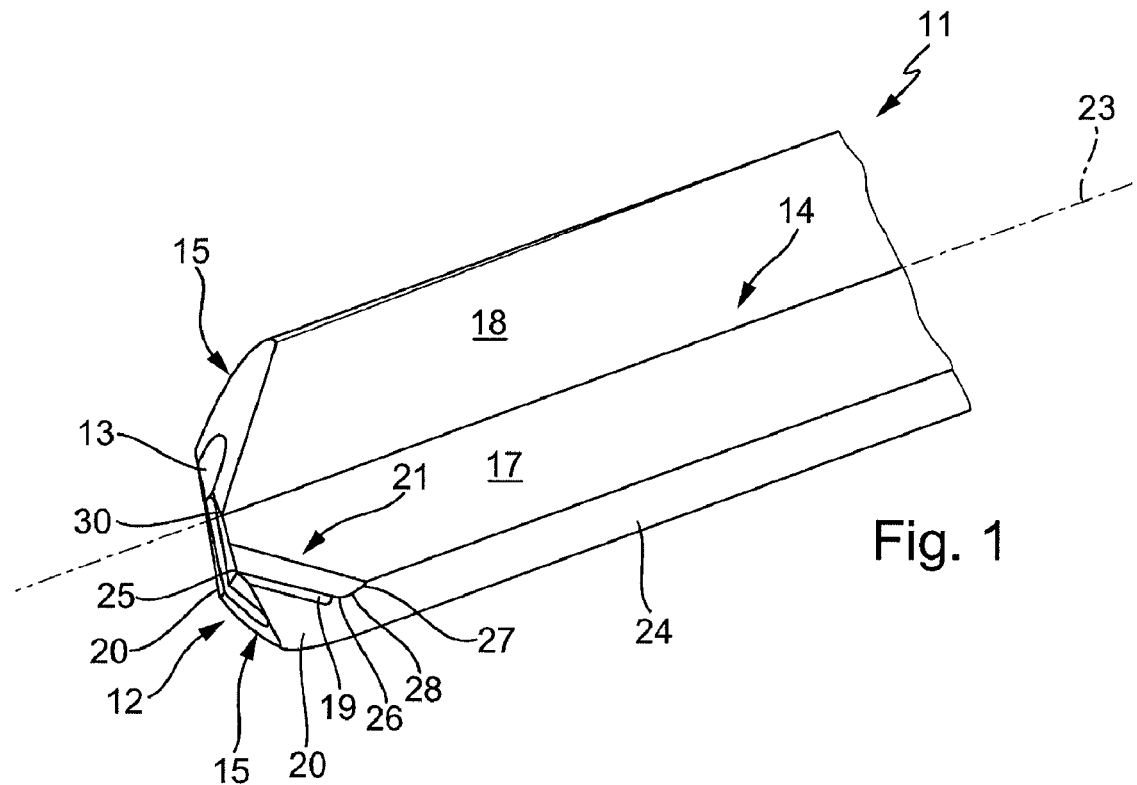
FIG. 1 A perspective view of an embodiment of a drill head of the single-lip drill according to the invention.

FIG. 1 shows an embodiment of the single-lip drill according to the invention, merely showing the drill head 11. Single-lip drills essentially comprise a drill shank and a drill head 11 more particularly integrally joined to the shank, or a solid hard metal or carbide tool. The shank is joined to the drill head 11 preferably by a soldering process, e.g. by brazing. The drill shank is connected to a clamp collar, which is in turn fixed in a tool mounting of a single-lip deep drilling machine. The shank or the solid hard metal tool can be firmly connected, particularly integrally with the clamp collar, e.g. by an adhesive or soldered joint.

The single-lip drill together with the clamp collar is also referred to as a single-lip deep drilling tool.

The drill head 11 has a blade or bit 12 formed in the vicinity of the end face thereof, a cooling lubricant or coolant supply channel 13 in the interior of the drill head 11, a groove or corrugation 14 for removing the coolant-chip mixture and work guides 15 on the circumference and which during the drilling process are in direct contact with the workpiece to be machined and guide the single-lip drill in the hole.

The drill head is made from hard material, which allows a machining by cutting of the workpiece 16. The hard material is preferably a hard metal.

In the case of the single-lip drill coolant supply typically takes place through the coolant supply channel 13 in the interior of the drill and which extends from the drill shank to the drill head 11 along a drill axis 23 and which terminates at the end face of the drill head 11 in a coolant outlet. In the case of deep drilling the coolant has a number of functions. It lubricates the bit 12 and work guides 15 and therefore reduces friction and wear to the single-lip drill. Another function is cooling, i.e. the dissipation of heat from the tool and workpiece 16. Finally, the coolant ensures a continuous chip removal of the cut off chips 22. Coolants for deep drilling are generally not water-miscible coolants, particularly deep drilling oils. Optionally it is possible to provide additives for improving the use characteristics, e.g. for reducing wear.

Figure 2:
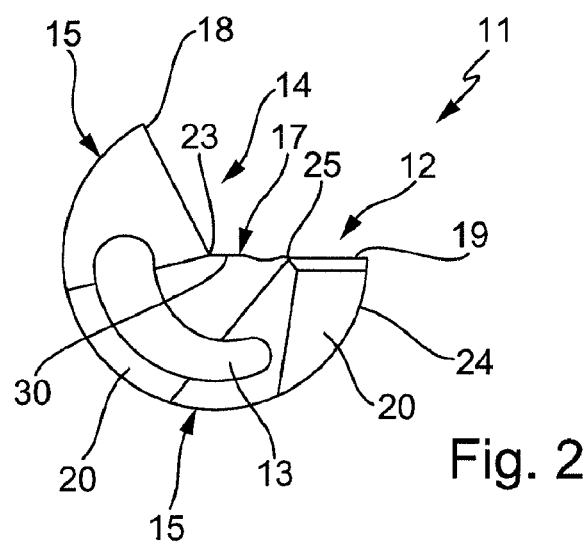
FIG. 2 A front view of the single-lip drill of FIG. 1.

The outer corrugation or groove 14 for the removal of the coolant-chip mixture is also typical in the case of single-lip drills. Thus, in a front view (FIG. 2) the single-lip drill looks like a "tart" from which a portion has been removed, the resulting gap constituting the corrugation 14. The corrugation 14 has two boundary surfaces 17, 18, more particularly at an obtuse angle to one another and whereof the surface 17 is directly adjacent to the bit 12. The corrugation 14 extends along the drill axis 23 into the vicinity of the drill shank, where it ends. During the drilling process there is a chip bin in the vicinity of the shank and collects the removed coolant-chip mixture.

The bit 12 is located in the front area of the drill head 11. It is the part of the drill head 11 on which are located the cutting edge 19 (outer cutting edge), tool face, clearance 20, chip former 21 and inner cutting edge 30.

Figure 4:
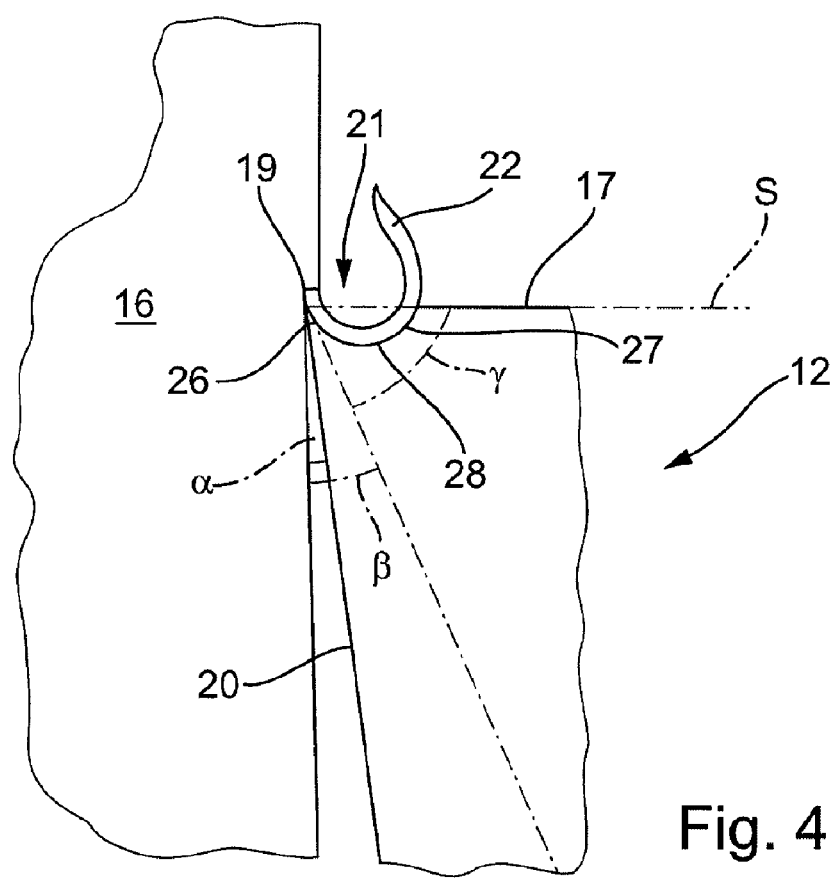
FIG. 4 A larger scale representation of detail X in FIG. 3 during the removal of a chip and the bit geometry.

FIG. 4 shows a typical bit or cutting wedge geometry for the single-lip drill. The cutting wedge is bounded by the clearance 20 and the tool face, which in the embodiment shown is represented by the chip former 21. The rake angle $\gamma$ is the angle between the tool face and an imaginary line S perpendicular to the machining face of the workpiece 16 to be machined directly at the cutting edge 19 or inner cutting edge 30. Outside the "cutting edge area", the angle is known as the tangent angle $\gamma^*$.

The clearance angle $\alpha$ is the free angle between the clearance and the worked surface. If it were 0°, then the clearance would rub strongly against the workpiece surface. Large clearance angles reduce the clearance wear, but favour the chipping away of the cutting edge. Thus, the clearance angle is made sufficiently large for the tool to cut sufficiently cleanly.

The wedge angle $\beta$ is the angle of the cutting wedge penetrating the workpiece. Its value is determined by the material to be machined and, together with the clearance angle and rake angle, always gives an angle of 90°. Thus, in the case of a rake angle of 0°, coincidence takes place between the tool face and the imaginary line S perpendicular to the machining surface. If the sum of the clearance angle and the wedge angle is smaller than 90°, then the difference at this value from a positive rake angle is referred to. Thus, a negative rake angle occurs if the sum of the clearance angle and the wedge angle exceeds 90°.

The cutting edge 19 or inner cutting edge 30 is the line where the tool face and clearance are in contact with one another. It comes directly into contact with the workpiece 16 to be machined and is responsible for a cutting off of chips 22.

Figure 3:
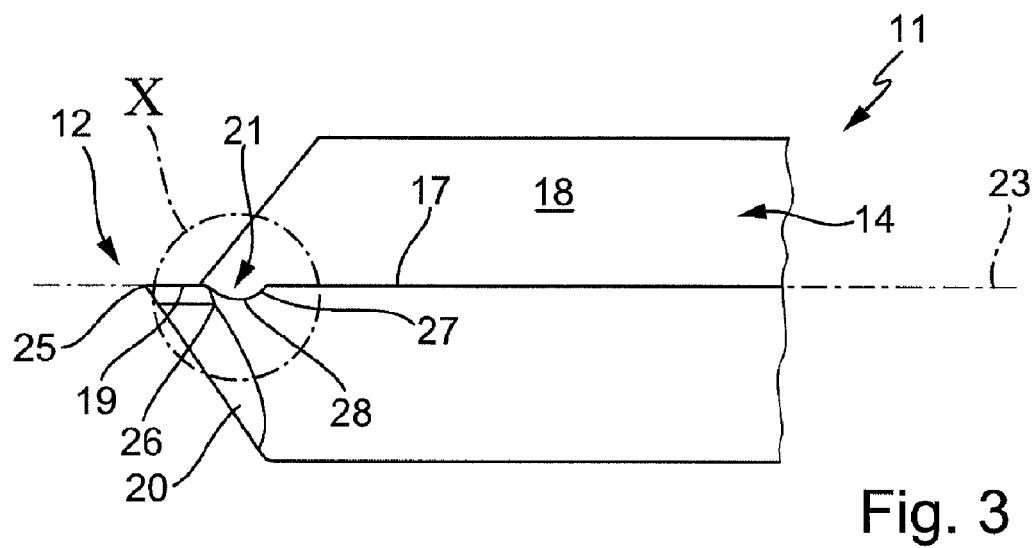
FIG. 3 A side view of the single-lip drill of FIG. 1.
Figure 5:
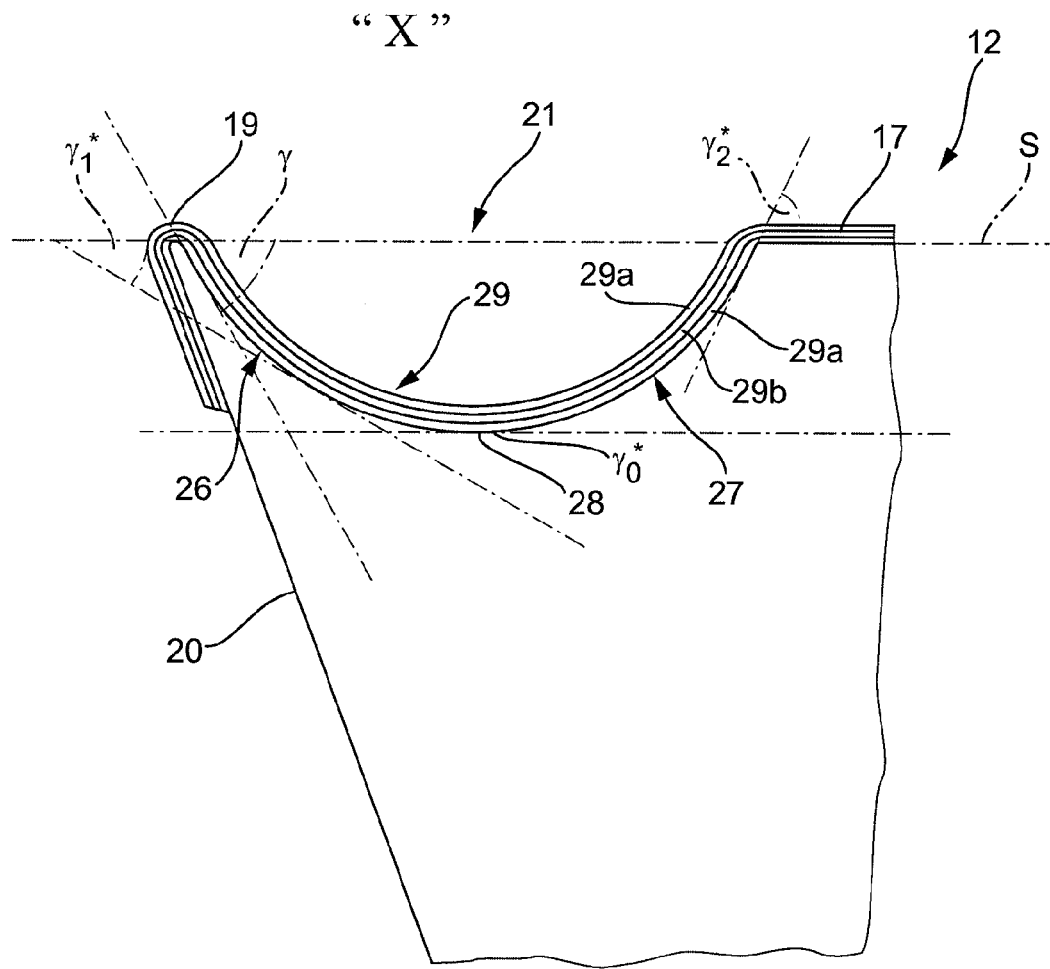
FIG. 5 On an even larger scale detail X, showing the different areas of the chip former and a multilayer functional coating.

As shown in FIG. 1, the cutting edge 19 is at an angle to a drill axis 23 and extends from one outer face 24 of the single-lip drill to its drill point 25. In the embodiment described a chip former 21 is only associated with the cutting edge 19 (outer cutting edge). The chip former 21 is directly adjacent to the cutting edge 19 and runs parallel thereto between the outer face 24 and the drill point 25. The chip former 21 is shaped like a slot with a U-shaped cross-section (FIGS. 3, 4 and 5). It can be subdivided into two areas, namely into a chip guide face 26 substantially directly adjacent to the cutting edge 19 and which is used for guiding the chips 22 and into a chip break section 27 at a distance from the cutting edge 19 and which is used for breaking the chips 22.

As shown in FIG. 4 and in particular FIG. 5, the chip guide face 26 extends from the cutting edge 19 to the bottom 28 of the slot. The chip break section 27 follows on directly to the chip guide face 26 and extends from the slot bottom 28 to the boundary surface 17 of corrugation 14. It is a characteristic of the chip guide face 26 and chip break section 27 that the chip compression for the chips 22 which are formed constantly increases until chip break finally occurs in the chip break section 27.

The ever greater chip compression is brought about by the curved chip guide face 26 and the also curved chip break section 27, the tangent angle constantly changing starting from a relatively large rake angle $\gamma$. This is e.g. represented by four different rake or tangent angles $\gamma, \gamma^*_0, \gamma^*_1$ in four different areas of the chip former 21. The rake or tangent angle $\gamma$ respectively $\gamma^*$ can be determined by applying a tangent to the chip former curvature in the relevant areas. Chip compression is lowest at the cutting edge 19 and this is represented by a large, positive rake angle γ. The inclination between the imaginary line S perpendicular to the machining surface of the workpiece 16 and the chip guide face 26 in this area is consequently at a maximum. A low chip compression reduces the surface loading of the chip guide face 26 in this area, e.g. friction between chips 22 and chip guide face 26 is reduced. The compression of chips 22 becomes greater towards the slot bottom 28, which is e.g. illustrated by the rake angle $\gamma^*_1$, which is smaller, i.e. less positive than the rake angle γ.

The rake angle $\gamma^*_0$ is high at the slot bottom 28, where the chip break section 27 commences, being characterized by high chip compression represented by a negative tangent angle $\gamma^*$. There is a continual chip compression rise in the chip break section 27 and it is at a maximum at the transition to the boundary surface 17 of corrugation 14. This is shown in exemplified manner by the large negative rake angle $\gamma^*_2$. The precise breaking point of chip 22 is dependent on several factors, e.g. the deformability of the workpiece material, the drill machining rate, the steepness of the chip break section 27, the weight of the chips 22, etc. The spacing between the chip break section 27 and the cutting edge 19 also influences the chip size. A desired chip size can be set by varying this spacing. The spacing is preferably 0.3 to 0.6 mm.

FIG. 5 shows a functional coating 29 of the single-lip drill, exemplified by the coating of the chip former 21. The main function of the functional coating 29 is to reduce wear on the functional surfaces participating in the cutting process. Such functional surfaces are e.g. the bit 12 with cutting edge 19, chip former 21, clearance 20, the work guides 15 used for supporting purposes in the hole and the boundary surfaces 17, 18 of the chip-removing corrugation 14. Particular importance is attached to the coating of the cutting edge 19 and chip former 21, because the greatest wear occurs there. The functional coating acts in friction-reducing manner, so that there is a reduction to the friction between the chips 22 formed and the chip former 21, particularly the chip guide face 26 thereof, which leads to reduced heat evolution in this area. The functional coating 29 also protects the surface of the chip guide face 26 and the chip break section 27, so that it is possible to prevent cratering or pitting, in which material chips off the surface as a result of the impinging chips 22. The functional coating 29 also reduces adhesion, so that in the vicinity of the cutting edge 19 it is possible to avoid so-called "built-up cutting edges", namely a material welding between chips 22 and cutting edge 19.

The material of the functional coating 29 is a metallic hard material, particularly titanium aluminium nitride. As shown in FIG. 5, the functional coating 29 can have several layers, i.e. forms a type of multilayer coating. This is exemplified by a functional coating 29 consisting of three layers. The bottom layer in direct contact with the chip former 21 is a hard material layer 29a, above which there is a soft material layer 29b, which is covered by a further hard material layer 29a, which in turn forms the outer layer constituting the surface.

Figure 6:
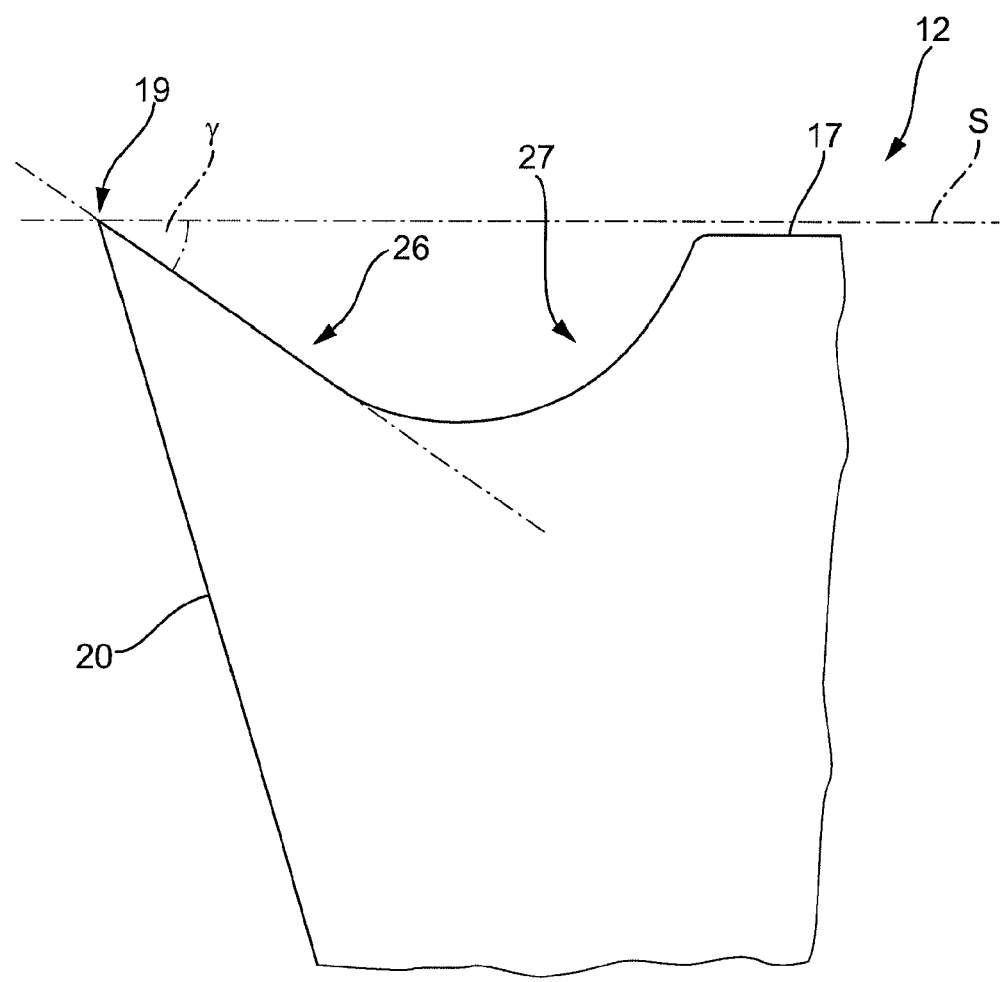
FIG. 6 An alternative embodiment in which the chip guide surface is in the form of a sloping surface with a uniform tangent angle.

FIG. 6 shows an embodiment in which the chip guide surface 26 of the chip former is not curved but is instead in the form of a sloping surface with a uniform, positive tool face or tangent angle γ. This sloping chip guide surface can be followed by a curved or radius-provided chip break section 27.

Method for the Manufacture of a Single-Lip Drill and Drilling Process

For the manufacture of the single-lip drill, firstly the drill shank is produced by cutting to a corresponding length a raw material. The raw material can be an in particular steel tube, so that the tube interior forms part of the coolant supply channel 13. This is followed by the application of the corrugation 14 for removing the coolant-chip mixture, e.g. by rolling in the drill shank.

The hard metal drill head 11 is produced by a sintering process, the drill head-side part of the coolant supply channel 13 and the corrugation 14 being already provided.

The sintered drill head 11 and drill shank are integrally joined by brazing.

It is alternatively possible to produce the drill head 11 and drill shank from one sintered hard metal piece.

This is followed by the grinding in the drill head 11 of the bit 12, together with the cutting edge 19 and chip former 21. The final method step involves the chip former 21 being provided with the functional coating 29. Compared with conventional production methods, where the final step involves the grinding in of the chip former, this offers the advantage that a coating of the chip former 21 with the functional coating 29 is ensured.

In the case of spot drilling single-lip drilling tools must be guided in a spot drilling bush, because the drilling forces do not cancel one another out, such as is e.g. the case with twist drills having two bits. Thus, the tool must be supported or guided during the drilling process.

Thus, in the single-lip drilling process, the single-lip drill is initially guided in the drill bush, which is located in a drill bush support. When the tool enters the hole, the latter then takes over the guidance function. Alternatively a guide hole can take over the function of a drill bush.

Thus, the bit 12 of the drill head 11 penetrates the workpiece 16 to be machined. The cutting edge 19 comes directly into contact with the workpiece 16, so that chips 22 are cut off. A cut off chip 22 firstly strikes the chip guide face 26 of the chip former 21 in the vicinity of the cutting edge 19. The positive rake angle γ ensures that no pronounced compression of the chip 22 occurs in the vicinity of the chip guide face 26, which ensures that said chip 22 is shaped and does not break. As a result of the changing curvature of the chip guide face 26, the compression or pressure on the chip 22 is continuously increased. The chip slides along the chip guide face 26 and reaches the chip break section 27 where, as a result of the negative tangent angle $\gamma^*$, it is strongly compressed and finally breaks. As a result of the variation of the spacing between the cutting edge 19 and the chip break section 27, the size of the chip can be set in planned manner, so that it can be adapted to the coolant conditions, e.g. a minimum quantity lubrication. It is possible to vary the curvatures or gradients of the chip guide face 26 and/or chip break section 27, so as in this way to produce a given chip shape or chip size.

The invention claimed is:

1. A single-lip drill comprising:
   a drill head;
   a bit integrally formed on the drill head and defining a cutting wedge; and
   at least one cutting edge provided on the cutting wedge for machining by cutting of a workpiece,
   wherein the cutting edge is associated at least one chip former for shaping the chips cut off by the cutting edge;
   wherein the chip former comprises a slot having a substantially U-shaped cross-section and has a positive rake angle (γ) between the tool face and an imaginary line perpendicular to a machining face of the workpiece to be cut;
   wherein the chip former has a chip guide face extending from the cutting edge towards a bottom of the chip former and a chip break section following the chip guide face, commencing at a distance from the cutting edge, and extending to a boundary surface with respect to a corrugation for removing a coolant-chip mixture; and wherein the chip guide face comprises a sloping surface with a constant tangent angle, which sloping surface is followed by a curved chip breaking section.

2. The single-lip drill according to claim 1, wherein the rake angle ($\gamma$) is between 10 and 30°.

3. The single-lip drill according to claim 1, wherein a functional coating is provided on at least one functional surface of the single-lip drill.

4. The single-lip drill according to claim 2, wherein the chip break section is positioned at a distance from the cutting edge suitable for setting a desired chip size.

5. The single-lip drill according to claim 4, wherein the distance is between 0.2 and 1.5 mm.

6. The single-lip drill according to claim 1, wherein the chip former slot is adjacent to the cutting edge.

7. The single-lip drill according to claim 1, wherein the functional coating is configured to increase wear resistance.

8. The single-lip drill according to claim 3, wherein at least one of the chip former and at least one clearance is provided with the functional coating.

9. The single-lip drill according to claim 3, wherein the functional coating is provided on all the functional surfaces participating in the cutting process.

10. The single-lip drill according to claim 1, wherein the functional coating is at least partly made from hard material.

11. The single-lip drill according to claim 10, wherein the hard material is a metallic hard material.

12. The single-lip drill according to claim 11, wherein titanium aluminium nitride is provided as the metallic hard material.

13. The single-lip drill according to claim 1, wherein the functional coating has several layers.

14. The single-lip drill according to claim 13, wherein at least one hard material layer and at least one soft material layer adjacent to the hard material layer is provided, the hard material layer forming an outer layer.

15. The single-lip drill according to claim 11, wherein a nitride or carbide is provided as the metallic hard material.

16. The single-lip drill according to claim 2, wherein the rake angle ($\gamma$) is between 15 and 25°.

17. The single-lip drill according to claim 5, wherein the distance is between 0.3 and 0.6 mm.

* * * * *